United States Patent
Sebire et al.

(10) Patent No.: US 6,665,289 B1
(45) Date of Patent: Dec. 16, 2003

(54) WIRELESS TELECOMMUNICATIONS SYSTEM EMPLOYING DYNAMIC MULTISLOT CLASS

(75) Inventors: Benoist Sebire, Helsinki (FI); Jari Vallstrom, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/476,404

(22) Filed: Jan. 20, 2000

Related U.S. Application Data (60) Provisional application No. 60/137,252, filed on Jun. 2, 1999, and provisional application No. 60/137,106, filed on Jun. 1, 1999.

(51) Int. Cl.⁷ .............................................. H04B 7/212
(52) U.S. Cl. ..................... 370/347; 370/337; 370/350; 455/67.16
(58) Field of Search ................................ 370/347, 235, 370/236, 314, 321, 328, 329, 332, 337, 345, 350, 442, 458, 468, 498, 500; 375/354, 355; 455/67.16, 63.1

(56) References Cited

U.S. PATENT DOCUMENTS

| | | | |
|---|---|---|---|
| 5,483,537 A | | 1/1996 | Dupuy ........................ 370/95.3 |
| 5,831,974 A | * | 11/1998 | Suonvieri .................... 370/252 |
| 6,101,177 A | * | 8/2000 | Bodin et al. ................. 370/336 |
| 6,201,819 B1 | * | 3/2001 | Luders ........................ 370/508 |
| 6,240,076 B1 | * | 5/2001 | Kanerva et al. ............. 370/330 |

FOREIGN PATENT DOCUMENTS

| | | |
|---|---|---|
| EP | 0295227 A1 | 12/1988 |
| WO | WO-97/12451 | 4/1997 |
| WO | WO-98/15147 | 4/1998 |

OTHER PUBLICATIONS

Mouley, Michel and Pautet, Marie–Bernadette, "The GSM System for Mobile Communications", 1992.

* cited by examiner

*Primary Examiner*—Dang Ton
*Assistant Examiner*—Tri H. Phan
(74) *Attorney, Agent, or Firm*—Harrington & Smith, LLP (57) ABSTRACT

A method is disclosed for operating a wireless TDMA communications system. The method includes steps of monitoring a propagation delay of a mobile station; and when the propagation delay exceeds a predetermined limit, changing by a time slot unit a value of one or both of $T_{ta1}$ and $T_{tb1}$, wherein $T_{ta1}$ is a minimum number of time slots allowed between the end of a last, previous receive time slot and a first, next transmit time slot, when a channel measurement is to be performed in between, and wherein $T_{tb1}$ is a minimum number of time slots allowed between the end of a last, previous receive time slot and a first, next transmit time slot.

22 Claims, 6 Drawing Sheets

FIG.1
PRIOR ART

TA : TIMING ADVANCE

Trt : TIME FROM END OF RECEPTION TO START OF TRANSMISSION = 2BP − TA

Ttr : TIME FROM END OF TRANSMISSION TO START OF RECEPTION = 4BP + TA

WIRELESS TELECOMMUNICATIONS SYSTEM EMPLOYING DYNAMIC MULTISLOT CLASS

CLAIM OF PRIORITY FROM COPENDING PROVISIONAL PATENT APPLICATIONS

Priority is herewith claimed under 35 U.S.C. §119(e) from copending Provisional Patent Application No. 60/137,106, filed Jun. 1, 1999, by Benoist Sebire and Jari Vallström. Priority is also herewith claimed under 35 U.S.C. §119(e) from copending Provisional Patent Application No. 60/137, 252, filed Jun. 2, 1999, by Benoist Sebire and Jari Vallström. The disclosure of each of these Provisional Patent Applications is incorporated by reference herein in its entirety.

FIELD OF THE INVENTION

This invention relates generally to radiotelephones and radiotelephone systems and, in particular, to time division multiple access (TDMA) cellular radiotelephones or mobile stations, as well as to radio communications systems and networks.

BACKGROUND OF THE INVENTION

In at least one type of TDMA radio communications system the start of a reverse TDMA frame on the uplink, i.e., from the mobile station (MS) to a base station (BS), is delayed by a fixed period of three timeslots from the start of a forward TDMA frame on the downlink, i.e., from the base station to the mobile station. After adding a propagation delay, which is compensated for by a timing advance (TA) parameter, one obtains the situation depicted in FIG. 1.

Figure 1:
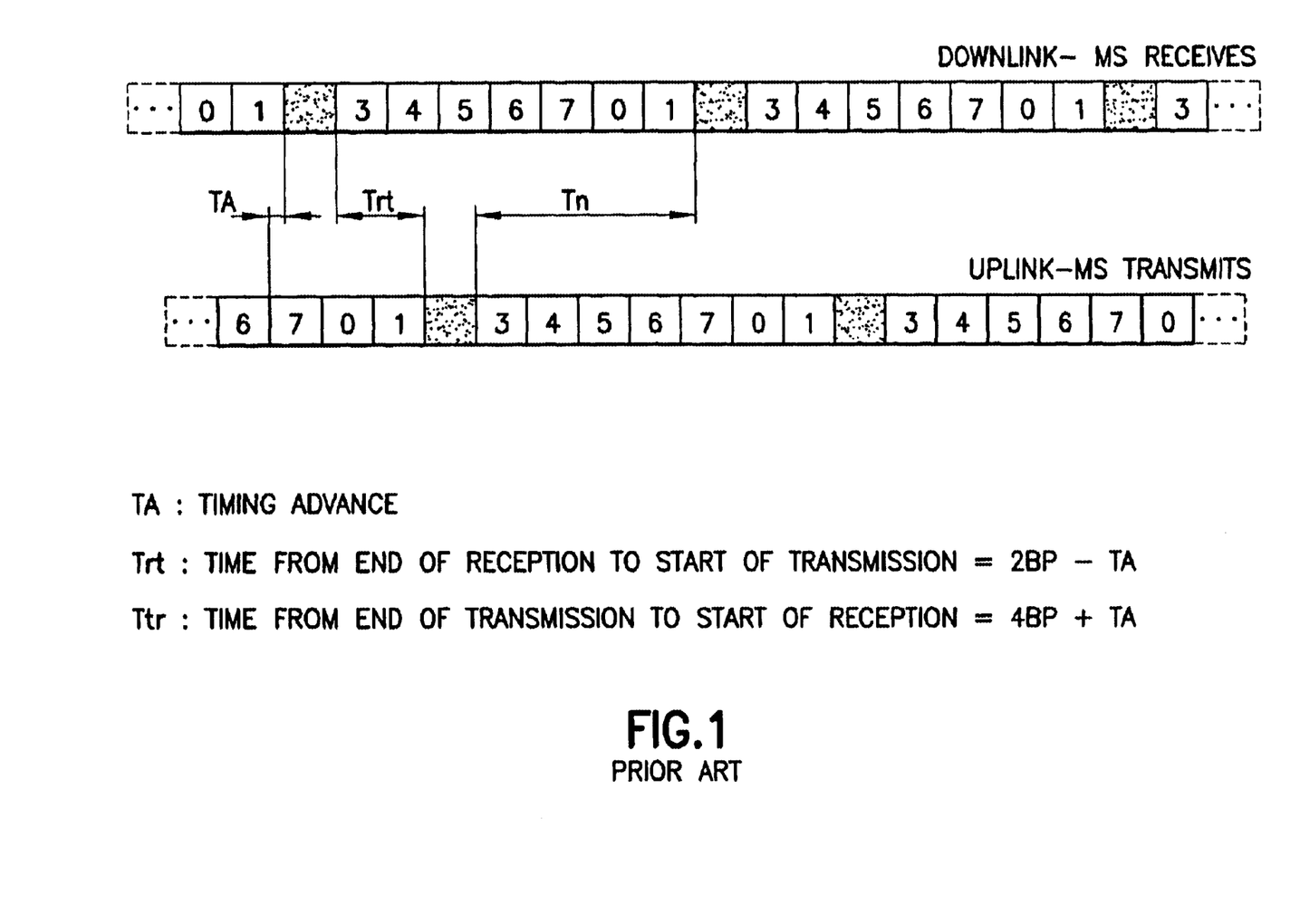
FIG. 1 is a diagram illustrating conventional downlink and uplink TDMA time slots, and further depicts the timing advance (TA) and related parameters.

As may be appreciated, an increase of the TA induces a decrease of $T_{rt}$ (the time from the end of reception to the start of transmission.) However, this decrease of $T_{rt}$ can result in the occurrence of one or more problems. For example, then the mobile station is far enough from its serving base transceiver station, or BTS, TA can become larger than some maximum value expected by the wireless network. By example, in a Global System for Mobile Communications (GSM) network this maximum value corresponds to a cell radius of about 35 km, and therefore $T_{rt}$ can become less than an expected minimum value. This is significant, as the minimum value of $T_{rt}$ is used to fix the multislot capability of the mobile station and network.

Two parameters depend on $T_{rt}$, as specified in a document entitled "GSM 05.02: Digital cellular telecommunication system (Phase 2+); Multiplexing and multiple access on the radio path". The two parameters are as follows:

$T_{ta}$: For a type 1 mobile station (i.e., one that is not required to transmit and receive at the same time) this parameter specifies a minimum number of timeslots that will be allowed between the end of the previous transmit or receive time slot and the next transmit time slot, when a channel measurement is to be performed by the mobile station in between.

$T_{tb}$: For the type 1 mobile station this parameter specifies the minimum number of timeslots that will be allowed between the end of the last receive time slot and the first, next transmitted time slot, or between the previous transmit time slot and the next transmit time slot when the frequency is changed in between.

These two parameters are specified in numbers of timeslots. Thus, if TA is large enough the effective value (from the mobile station point of view) can be reduced by one time slot. However, it cannot be reduced by a value of two timeslots since TA is limited in such a way that this is not possible. In other words, the cells are not large enough.

Figure 2:
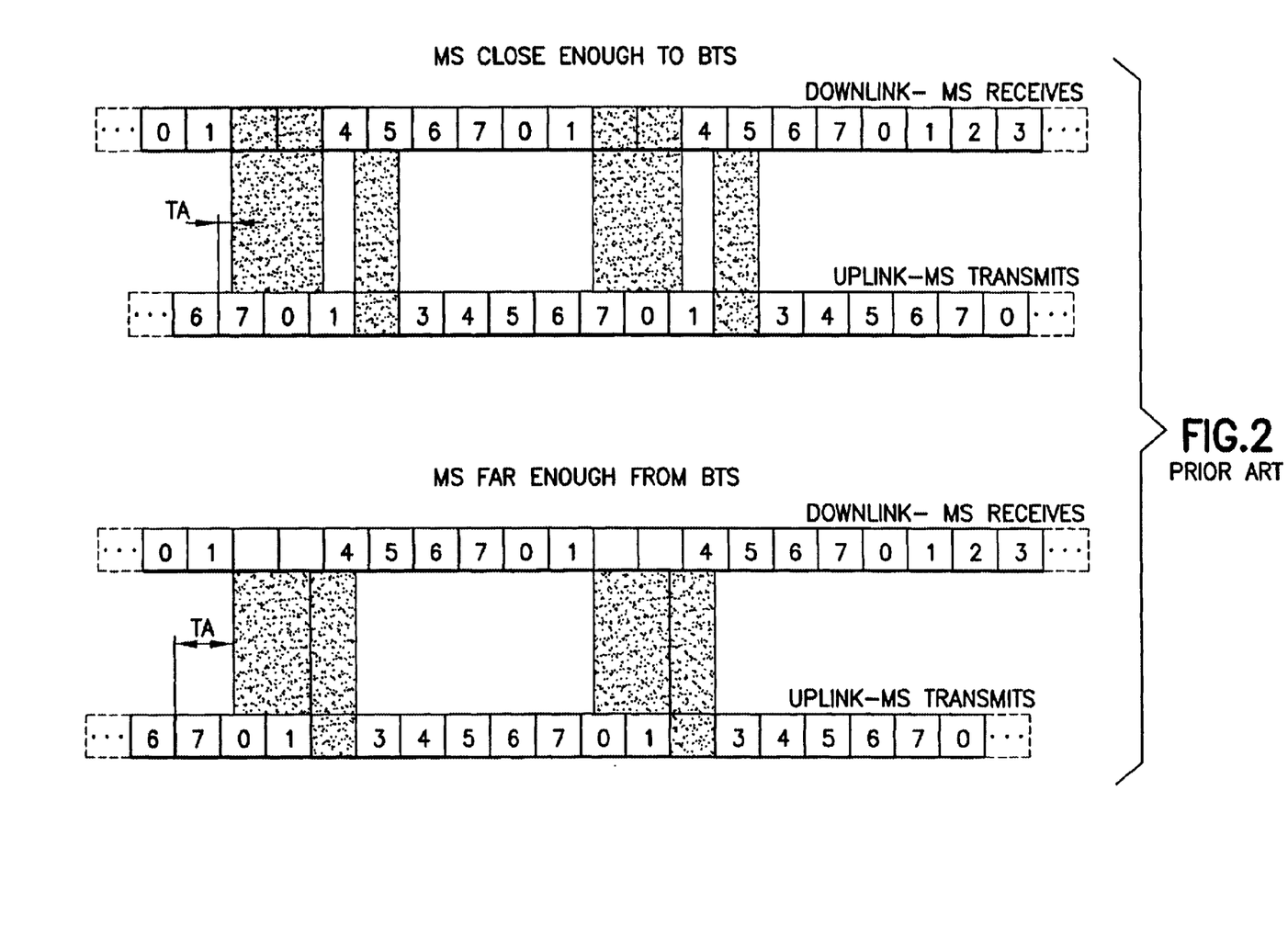
FIG. 2 illustrates the effect of the known overlapping problem.

By example, when a type 1 mobile station travels further than the maximum cell radius that is specified in GSM (35 km), its $T_{rt}$ is decreased to the point that the mobile station may not be able to transmit on some portion of its allocated uplink burst after receiving its downlink burst. This can be referred to as an overlapping case, and an example thereof, with the following allocations, is shown in FIG. 2. Assume for the case of FIG. 2 that the network is HSCSD and asymmetric, that downlink time slots 2 and 3 are used, and that time slot 2 is used on the uplink. When the mobile station is sufficiently far from its serving BTS, the increase in the TA results in an overlap of the uplink and downlink bursts. Therefore, one burst would be lost by type 1 mobile stations.

On the other hand, an increase in TA induces an increase in $T_{rr}$. Thus, no problem should arise with the associated parameters ($T_{ra}, T_{rb}$). Reference in this regard can be had to the above-noted document: "GSM 05.02: Digital cellular telecommunications system (Phase 2+); Multiplexing and multiple access on the radio path". The effective value of the parameters, from the mobile station point of view, cannot become lower than the minimum value expected.

It is known in the prior art to deal with large radius cells by forbidding traffic in consecutive time slots. However, this technique can reduce the capacity of the network by one half for the affected mobile stations, and does not support multislot operation, such as that specified for HSCSD or GPRS.

OBJECTS OF THE INVENTION

It is thus a first object of this invention to provide a method to enlarge the cell radius in a TDMA system, while avoiding problems resulting from the longer propagation delays.

It is another object and advantage of this invention to provided dynamic method of modifying at least one timing parameter to accommodate a mobile station in a large radius cell of a TDMA network.

SUMMARY OF THE INVENTION

The foregoing and other problems are overcome and the objects of the invention are realized by methods and apparatus in accordance with embodiments of this invention.

A method is disclosed to effectively enlarge the cell radius in a TDMA based system in such a way that the timing advance (TA) parameter is modified by increasing the parameter range. The timing advance may be greater than one time slot and less than two time slots. Uplink and downlink overlapping is prevented by decreasing the time limit requirement from the end of reception to the start of transmission. A $T_{rt}$ value is allowed to decrease in the same respect as the TA parameter is allowed to be increased, when compared to the conventional GSM system, and a maximum additional decrease of the $T_{rt}$ value is one time slot. The propagation delay increase of cells having a larger radius is monitored in the base station, and the value of TA can be considered as well when mapping channels in the base station.

In an exemplary embodiment, and considering a GSM450 case, the radius of a cell can be larger than the conventional GSM radius (35 km). In order to cope with this increase in cell radius, the timing advance parameter is modified such that its effective range is increased. However, because of the greater range of the timing advance parameter, the operation of the TDMA mobile station may be adversely affected in such a way that bursts in the uplink (reverse link) and in the downlink (forward link) would overlap in time. An aspect of this invention is thus in providing a technique to make a multislot capability of the mobile station dynamic, thereby mitigating or eliminating this problem.

A method is disclosed for operating a wireless TDMA communications system. The method includes steps of monitoring a propagation delay of a mobile station; and when the propagation delay exceeds a predetermined limit, changing by a time slot unit a value of one or both of $T_{ta1}$ and $T_{tb1}$, wherein $T_{ta1}$ is a minimum number of time slots allowed between the end of a last, previous receive time slot and a first, next transmit time slot, when a channel measurement is to be performed in between, and wherein $T_{tb1}$ is a minimum number of time slots allowed between the end of a last, previous receive time slot and a first, next transmit time slot.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 3:
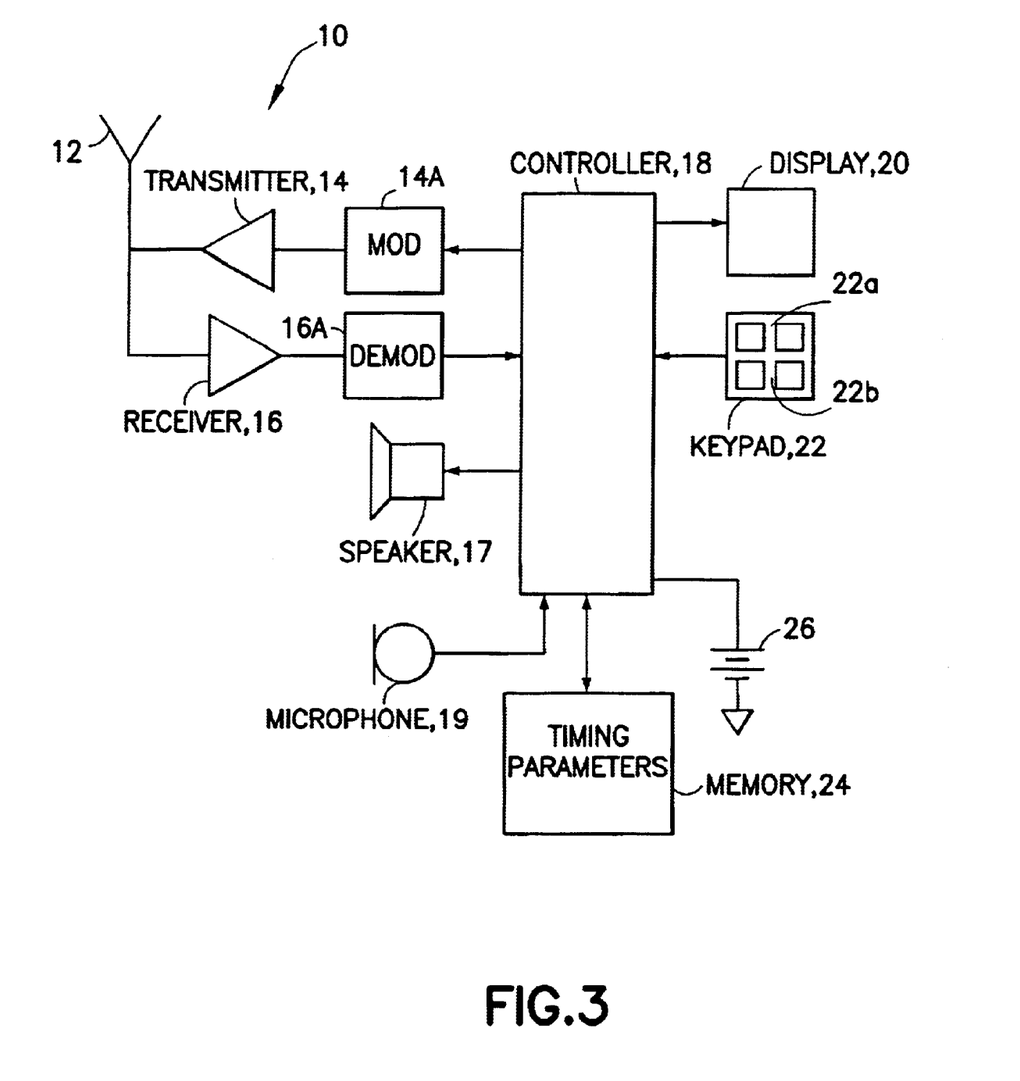
FIG. 3 is a block diagram of an embodiment of a mobile station that is suitable for use in the TDMA system in accordance with the teachings of this invention.
Figure 4:
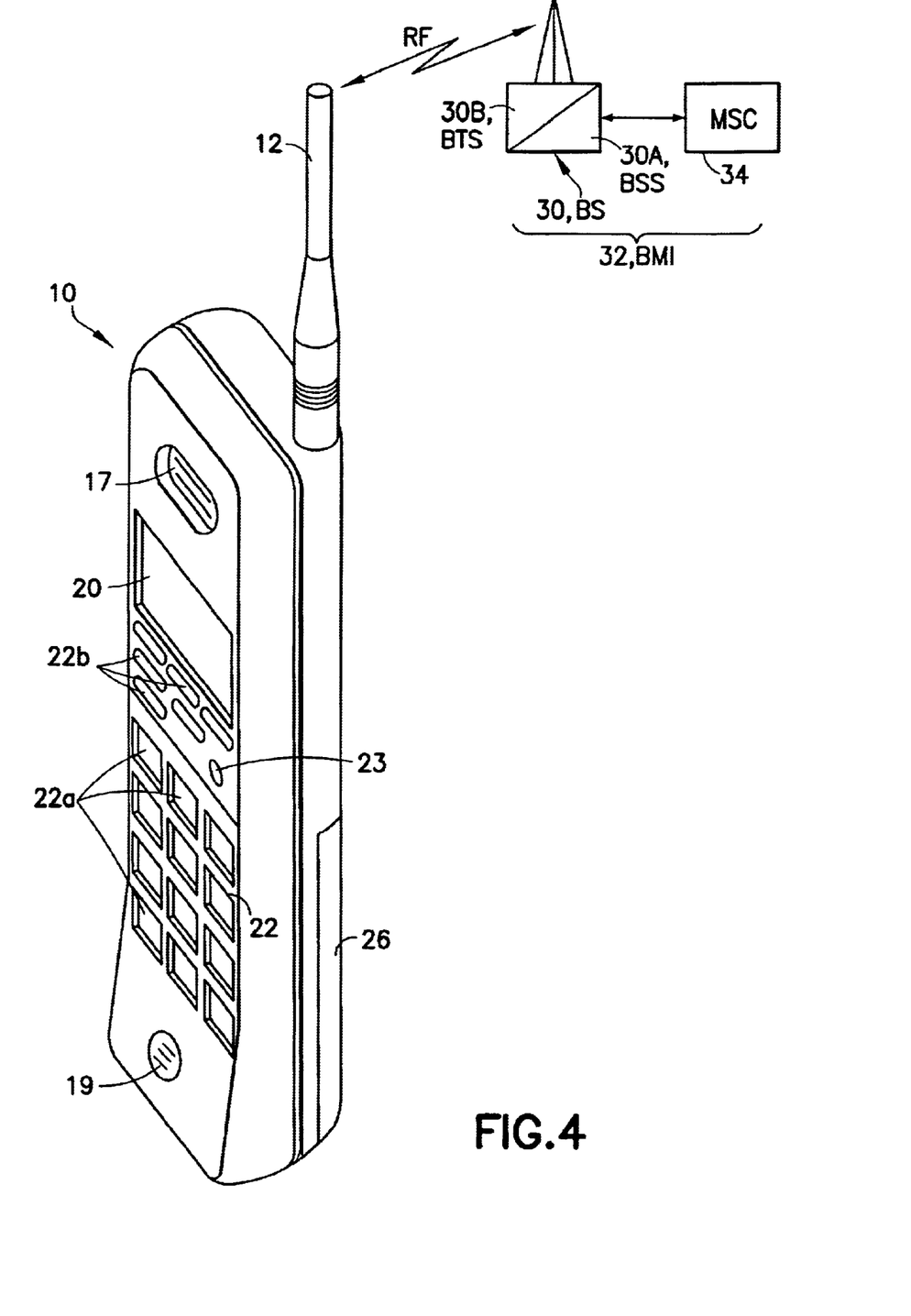
FIG. 4 is an elevational view of the mobile station shown in FIG. 3, and which further illustrates a wireless communication system to which the mobile station is bidirectionally coupled through RF links.

Reference is first made to FIGS. 3 and 4 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30, which is assumed to include a base station sub-system (BSS) 30A as well as a base transceiver station (BTS) 30B. For simplicity, these two components are collectively referred to simply as the base station 30. The BSS 30A may be coupled to a plurality of the BTS 30B. The base station 30 is a part of a wireless network 32 that includes a mobile switching center (MSC) 34 or similar apparatus. The MSC 34 provides a connection to landline trunks.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to be based on TDMA, such as is known from, or that is similar to GSM. The teachings of this invention are not, however, intended to be limited only to a GSM-type of TDMA system. With general regard to GSM mobile stations and networks, reference can be had to "The GSM System for Mobile Communications", by Michel Mouly and Marie-Bernadette Pautet, 1992, the disclosure of which is incorporated by reference in its entirety.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface may include a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. The mobile station 10 also includes a battery 26 for powering the various circuits that are required to operate the mobile station. The mobile station 10 also includes various memories, shown collectively as the memory 24, wherein are stored a plurality of constants and variables that are used by the controller 18 during the operation of the mobile station. Certain TDMA timing related parameters that are transmitted from the base station 30 to the mobile station 10, which are of most interest to this invention, are typically stored in the memory 24 for use by the controller 18. It should be understood that the mobile station 10 can be a vehicle mounted or a handheld device. It should further be appreciated that the mobile station 10 can be capable of operating with one or more air interface standards, modulation types, and access types, and may thus be a dual (or higher) mode device.

In accordance with the teachings of this invention, a technique is provided to adjust at least in part the meaning of $T_{ta}$ and $T_{tb}$, depending on the TA value associated with the mobile station 10. The adjustment of those two parameters results in the base station 30, in particular the BSS 30A, changing the mapping on the TDMA frames for the associated mobile station 10.

It should be noted that a dynamic mapping mechanism on a classmark change does already exist, and is referred to as a "class mark change procedure" in a publication: "GSM 04.08: Digital cellular telecommunication system (Phase 2+); Mobile radio interface layer 3 specification". However, in the instant case the change is not initiated by the mobile station 10, but by the base station 30, in particular by a data processor of the BSS 30A portion, which monitors the value of TA in order to detect possible problems.

In accordance with the teachings of this invention, when the value of TA is beginning to exceed one limit, the following parts of the definitions of $T_{ta}$ and $T_{tb}$ are changed within the BSS 30A.

For the case of $T_{ta1}$, the BSS 30A considers only a part of its meaning, i.e., the minimum number of time slots that will be allowed between the end of the previous receive time slot and the next transmit time slot, when a channel measurement is to be performed between.

For the case of $T_{tb}$, the BSS 30A considers only a part of its meaning, i.e., the minimum number of time slots that will be allowed between the end of the last previous receive time slot and the first, next transmit time slot.

It can be appreciated that these considered elements of $T_{ta}$ and $T_{tb}$ are those elements that are most directly affected by the problem described before (i.e., the decrease of $T_{rt}$ when TA increases). In general, a variation in the TA parameter does not affect those elements of $T_{ta}$ and $T_{tb}$ dealing with consecutive transmissions by the mobile station 10.

By way of a summary of the teachings of this invention, $T_{ta1}$ is a minimum number of time slots that are to be allowed between the end of the previous receive time slot and the next transmit time slot, when a channel measurement is to be performed in between. $T_{ta2}$ is a minimum number of time slots that are to be allowed between the end of the previous transmit time slot and the next transmit time slot, when a channel measurement is to be performed in between. $T_{tb1}$ is a minimum number of time slots that are to be allowed between the end of the last previous receive time slot and the first, next transmit time slot. $T_{tb2}$ is a minimum number of time slots that are to be allowed between the end of the last, previous transmit time slot and the first, next transmit time slot.

TA is preferably calculated by the BSS 30A by a continuous monitoring of propagation delays. Reference in this regard can be had to a publication entitled: "GSM 05.10: Digital cellular telecommunication (Phase 2+); Radio Subsystem Synchronization". As such, the teachings of this invention add an algorithm which monitors propagation delays as well.

Figure 5:
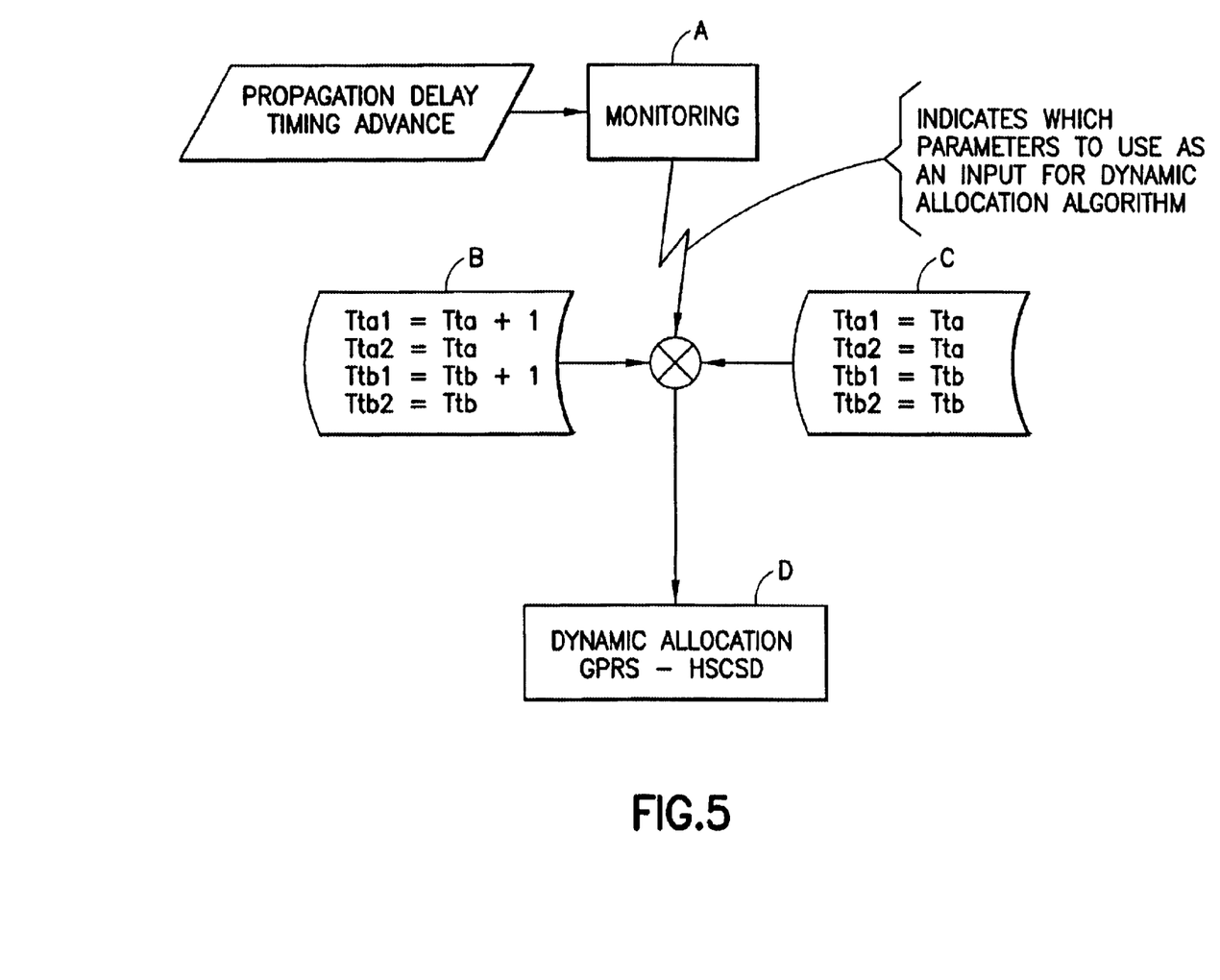
FIG. 5 is an illustration of a dynamic multislot class algorithm in accordance with the teachings of this invention.
Figure 6:
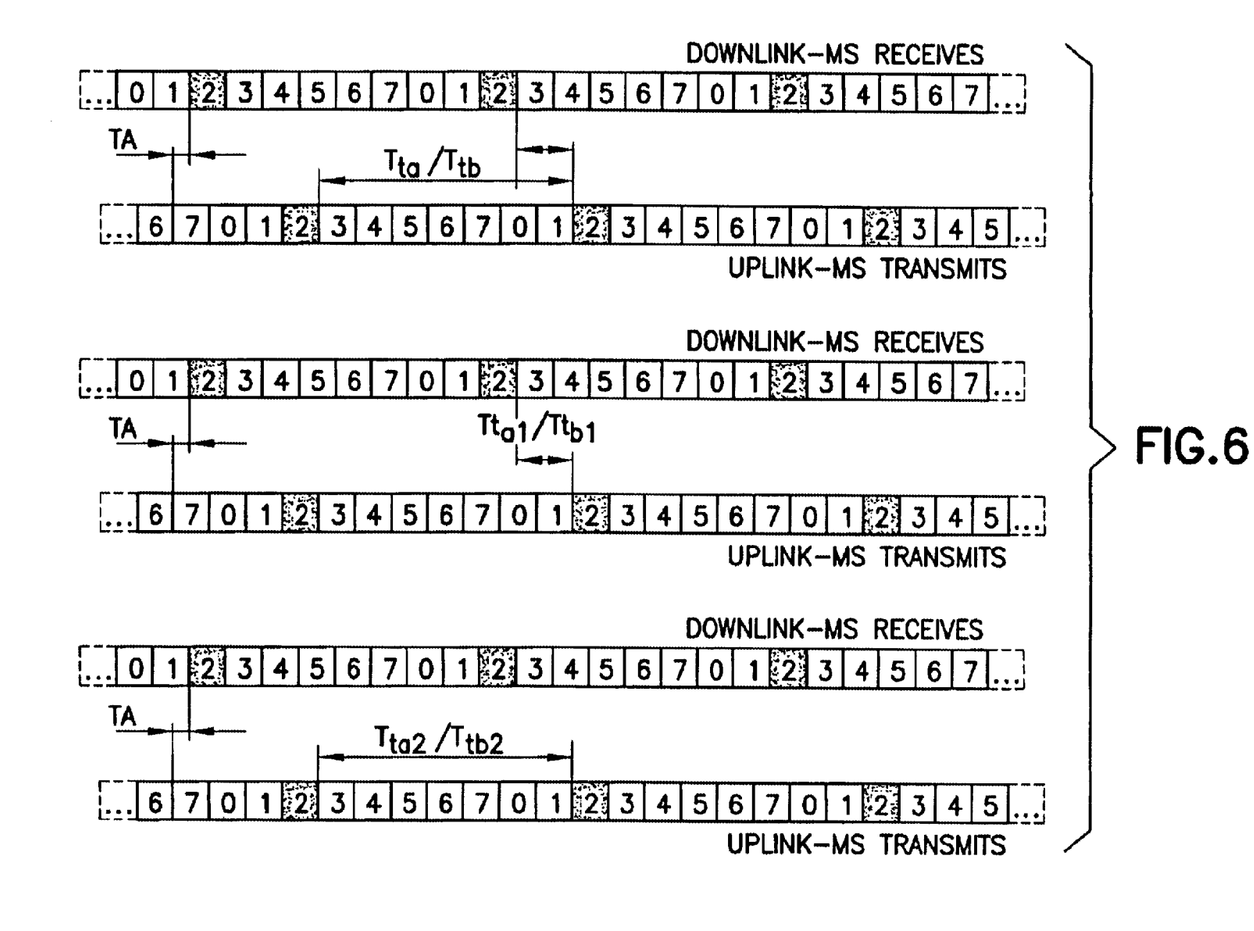
FIG. 6 shows a plurality of downlink and uplink slots, and the $T_{ta}$, $T_{tb}$, $T_{ta1}$, $T_{ta2}$, $T_{tb1}$ and $T_{tb2}$ timing advance relationships illustrated in FIG. 5.

FIG. 5 depicts an exemplary implementation of a Dynamic Multislot Class Algorithm executed by the BSS 30A in accordance with this invention. Reference can also be made to FIG. 6, which shows a plurality of downlink and uplink slots, and the $T_{ta}$, $T_{tb}$, $T_{ta1}$, $T_{ta2}$, $T_{tb1}$ and $T_{tb2}$ timing advance relationships illustrated in FIG. 5. While monitoring the mobile station 10 (Step A), the propagation delay from the mobile station 10 is found to exceed a predetermined limit (for example, 120 $\mu$s⇆TA of 240 $\mu$s⇆, cell radius of 35 km), and $T_{ta1}$ and $T_{tb1}$ are increased by one time slot unit in order to compensate for the increased TA at the current location of the mobile station 10 (Step B), and the BSS 30A thereafter causes at least the revised values of $T_{ta1}$ and $T_{tb1}$ to be transmitted to the mobile station 10 for storage in the mobile station memory 24. Otherwise $T_{ta1}$ and $T_{tb1}$ remain equal to $T_{ta}$ and $T_{tb}$, respectively (Step C). As a consequence the BSS 30A may also reexamine the mapping of the channels (Step D) in order to fulfill the new requirements, thus providing a dynamic allocation of system resources. For the case of HSCSD and GPRS, the new requirements may result in a reconsideration of resource allocation, e.g., free time slots which might overlap, and/or free time slots which cannot be received or transmitted because of the revised, more stringent timing schedule.

Below the predetermined limit, the meaning of the foregoing parameters remains the same as it is in a conventional GSM network (Step C). Thus, the different interpretation of $T_{ta}$ and $T_{tb}$ is preferably activated only when the mobile station 10 is located at some threshold distance from its serving BTS 30B, i.e., when its TA exceeds some predetermined limit. In general, the change of $T_{ta}$ and $T_{tb}$ functions as a trigger to initiate a new allocation.

Although described in the context of preferred embodiments, it should be realized that a number of modifications to these teachings may occur to one skilled in the art. Furthermore, and as was indicated above, the teachings of this invention may be applied to other types of TDMA networks and systems than GSM networks and systems.

Thus, while the invention has been particularly shown and described with respect to preferred embodiments thereof, it will be understood by those skilled in the art that changes in form and details may be made therein without departing from the scope and spirit of the invention.

What is claimed is:

1. A method to operate a wireless TDMA communications system, comprising:

a propagation delay of a mobile station to detect an occurrence of a condition that the propagation delay exceeds a predetermined limit; and in response to detecting that the propagation delay exceeds the predetermined limit, selecting parameters to increase the number of time slots dynamically for varying, by a predetermined amount, a minimum number of time slots allowed between the end of a last, previous receive time slot and a first, next transmit time slot, when a channel measurement is to be performed in between, and for varying a minimum number of time slots allowed between the end of a last, previous receive time slot and a first, next transmit time slot.

2. A method as in claim 1, wherein the predetermined amount is one time slot.

3. A method as in claim 1, and further comprising a step, in response to the steps of varying, of revising system resource allocations accordingly.

4. A method to operate a wireless TDMA communications system, comprising:

monitoring at a base station controller a propagation delay of a mobile station to detect an occurrence of a condition that the propagation delay exceeds a predetermined limit; and in response to detecting that the propagation delay exceeds the predetermined limit, selecting parameters to increase the number of time slots dynamically for changing by a time slot unit a value of one or both of $T_{ta1}$ and $T_{tb1}$, wherein $T_{ta1}$ is a minimum number of time slots allowed between the end of a last, previous receive time slot and a first, next transmit time slot, when a measurement is to be performed in between, and wherein $T_{tb1}$ is a minimum number of time slots allowed between the end of a last, previous receive time slot and a first, next transmit time slot.

5. A wireless TDMA communications system, comprising:

a base transceiver station (BTS);

a base station subsystem (BSS) coupled to said BTS; and at least one mobile station comprising a transceiver for operating within a coverage area of said BTS;

said BSS comprising a data processor for executing a dynamic multislot class algorithm by monitoring a propagation delay of the mobile station to detect an occurrence of a condition that the propagation delay exceeds a predetermined limit and, in response to detecting that the propagation delay exceeds the predetermined limit, for selecting parameters to increase the number of time slots dynamically for varying by a predetermined amount a minimum number of time slots allowed between the end of a last, previous receive time slot and a first, next transmit time slot, when a measurement is to be performed in between, and a minimum number of time slots allowed between the end of a last, previous receive time slot and a first, next transmit time slot.

6. A system as in claim 5, wherein the predetermined amount is one time slot.

7. A system as in claim 5, wherein said BSS data processor, in response to the propagation delay exceeding the predetermined limit, revises system resource allocations in accordance with the variation in the minimum number of time slots.

8. A method executed by a TDMA base station sub-system (BSS) to derive timing parameters for a mobile station, comprising:

monitoring a propagation delay of the mobile station to detect an occurrence of a condition that the propagation delay exceeds a predetermined limit;

in response to detecting that the propagation delay exceeds the predetermined limit, selecting parameters to increase the number of time slots dynamically comprising increasing by one time slot a value of $T_{ta1}$ and $T_{tb1}$, where $T_{ta1}$ is a minimum number of time slots allowed between the end of a last, previous receive time slot and a first, next transmit time slot, when a channel measurement is to be performed in between, and where $T_{tb1}$ is a minimum number of time slots allowed between the end of a last, previous receive time slot and a first, next transmit time slot, while maintaining a value of $T_{ta2}$, which is a minimum number of time slots that are allowed between the end of a previous transmit time slot and a next transmit time slot, when a channel measurement is to be performed in between, and a value of $T_{tb2}$, which is a minimum number of time slots that are allowed between the end of the last, previous transmit time slot and the first, next transmit time slot; and transmitting at least the values of $T_{ta1}$ and $T_{tb1}$ to the mobile station for storage in the mobile station.

9. A method to operate a wireless TDMA communications system, comprising steps of monitoring at a base station (30) a propagation delay of a mobile station and changing a time slot allocation, comprising:

changing the time slot allocation comprises at least partially redefining definitions of parameters $T_{ta}$ and $T_{tb}$ for said mobile station, where $T_{ta}$ specifies a minimum number of time slots that are allowed between the end of a previous transmit time slot or a previous receive time slot and a next transmit time slot, when a channel measurement is to be performed by the mobile station in between, and where $T_{tb}$ specifies a minimum number of time slots that are allowed between the end of a last receive time slot and a first, next transmit time slot, or between a previous transmit time slot and a next transmit time slot when the frequency is changed in between, said definitions being redefined such that, $T_{ta}$ is comprised of two parameters namely: $T_{ta1}$, which specifies the minimum number of time slots that are allowed between the end of the previous receive time slot and the next transmit time slot, when a channel measurement is to be performed by the mobile station in between, and $T_{ta2}$, which specifies the minimum number of time slots that are allowed between the end of the previous transmit time slot and the next transmit time slot, when a channel measurement is to be performed by the mobile station in between;

and such that $T_{tb}$ is comprised of two parameters namely: $T_{tb1}$, which specifies the minimum number of time slots that are allowed between the end of the previous receive time slot and the next transmit time slot; and $T_{tb2}$ which specifies the minimum number of time slots that are allowed between the end of the previous transmit time slot and the next transmit time slot;

the step of redefining further comprising changing by a time slot unit a value of one or both of $T_{ta1}$ and $T_{tb1}$.

10. A method as in claim 9, wherein a time slot unit is comprised of one time slot.

11. A method as in claim 9, and further in response to the propagation delay exceeding the predetermined limit, revising system resource allocations in accordance with the change in the value of one or both of $T_{ta1}$ and $T_{tb1}$.

12. A method as in claim 9, wherein said mobile station has multi-slot capability, and receives during a plurality of time slots within one TDMA frame.

13. A method as in claim 9, wherein said mobile station has High Speed Circuit Switched Data capability, and receives during a plurality of time slots within one TDMA frame.

14. A method as in claim 9, wherein said mobile station has General Packet Radio System capability, and receives during a plurality of time slots within one TDMA frame.

15. A method as in claim 9, wherein the change in one or both of $T_{ta1}$ and $T_{tb1}$ is transmitted to said mobile station and stored in said mobile station.

16. A wireless TDMA communications system, comprising a mobile station and a base station comprising means for monitoring a propagation delay of said mobile station and for changing a time slot allocation, further comprising:

said means is responsive to the propagation delay exceeding a predetermined limit for at least partially redefining definitions of parameters $T_{ta}$ and $T_{tb}$ for said mobile station, where $T_{ta}$ specifies a minimum number of time slots that are allowed between the end of a previous transmit time slot or a previous receive time slot and a next transmit time slot, when a channel measurement is to be performed by the mobile station in between, and where $T_{tb}$ specifies a minimum number of time slots that are allowed between the end of a last receive time slot and a first, next transmit time slot, or between a previous transmit time slot and a next transmit time slot when the frequency is changed in between, said definitions being redefined such that, $T_{ta}$ is comprised of two parameters namely: $T_{ta1}$, which specifies the minimum number of time slots that are allowed between the end of the previous receive time slot and the next transmit time slot, when a channel measurement is to be performed by the mobile station in between, and $T_{ta2}$, which specifies the minimum number of time slots that are allowed between the end of the previous transmit time slot and the next transmit time slot, when a channel measurement is to be performed by the mobile station in between;

and such that $T_{tb}$ is comprised of two parameters namely: $T_{tb1}$, which specifies the minimum number of time slots that are allowed between the end of the previous receive time slot and the next transmit time slot; and $T_{tb2}$ which specifies the minimum number of time slots that are allowed between the end of the previous transmit time slot and the next transmit time slot;

said means changing by a time slot unit a value of one or both of $T_{ta1}$ and $T_{tb1}$.

17. A wireless TDMA communications system as in claim 16, wherein a time slot unit is comprised of one time slot.

18. A wireless TDMA communications system as in claim 16, wherein said means is adapted further for, in response to the propagation delay exceeding the predetermined limit, revising system resource allocations in accordance with the change in the value of one or both of $T_{ta1}$ and $T_{tb1}$.

19. A wireless TDMA communications system as in claim 16, wherein said mobile station has multi-slot capability, and receives during a plurality of time slots within one TDMA frame.

20. A wireless TDMA communications system as in claim 16, wherein said mobile station has High Speed Circuit Switched Data capability, and receives during a plurality of time slots within one TDMA frame.

21. A wireless TDMA communications system as in claim 16, wherein said mobile station has General Packet Radio System capability, and receives during a plurality of time slots within one TDMA frame.

22. A wireless TDMA communications system as in claim 16, wherein the change in one or both of $T_{ta1}$ and $T_{tb1}$ is transmitted to said mobile station and stored in a memory of said mobile station.

* * * * *

UNITED STATES PATENT AND TRADEMARK OFFICE
CERTIFICATE OF CORRECTION

PATENT NO.    : 6,665,289 B1
DATED         : December 16, 2003
INVENTOR(S)   : Benoist Sebire and Jari Vallstrom It is certified that error appears in the above-identified patent and that said Letters Patent is hereby corrected as shown below:

<u>Column 6,</u>
At the beginning of line 9, insert -- monitoring --.

Signed and Sealed this

Twenty-fourth Day of February, 2004

JON W. DUDAS
*Acting Director of the United States Patent and Trademark Office*